(12) United States Patent
Fessele et al.

(10) Patent No.: US 7,426,868 B2
(45) Date of Patent: Sep. 23, 2008

(54) SENSOR MODULE

(75) Inventors: Thomas Fessele, Stuttgart (DE);
Masoud Habibi, Schwieberdingen (DE);
Christian Roesser, Grossbottwar (DE);
Markus Ledermann, Asperg (DE); Jan Gebauer, Karlsruhe (DE); Daniel Toews, Eisenach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/592,631

(22) PCT Filed: Nov. 17, 2004

(86) PCT No.: PCT/EP2004/052986

§ 371 (c)(1),
(2), (4) Date: Jul. 20, 2007

(87) PCT Pub. No.: WO2005/088268

PCT Pub. Date: Sep. 22, 2005

(65) Prior Publication Data

US 2008/0034877 A1      Feb. 14, 2008

(30) Foreign Application Priority Data

Mar. 12, 2004   (DE) ................ 10 2004 012 593

(51) Int. Cl.
*G01L 7/00* (2006.01)
(52) U.S. Cl. .......................... 73/756; 73/706
(58) Field of Classification Search ............ 73/706, 73/756
See application file for complete search history.

(56) References Cited

U.S. PATENT DOCUMENTS

| | | | |
|---|---|---|---|
| 5,948,991 A | 9/1999 | Nomura et al. | |
| 6,272,913 B1 | 8/2001 | Naegele et al. | |
| 6,615,669 B1 | 9/2003 | Nishimura et al. | |
| 6,668,658 B2 * | 12/2003 | Woersinger et al. | 73/723 |
| 6,805,010 B2 * | 10/2004 | Kuhnt et al. | 73/756 |
| 6,993,976 B2 * | 2/2006 | Fessele et al. | 73/756 |
| 7,036,380 B2 * | 5/2006 | Fessele et al. | 73/706 |
| 2003/0115967 A1 | 6/2003 | Kuhnt et al. | |

FOREIGN PATENT DOCUMENTS

DE   197 31 420   1/1989

\* cited by examiner

*Primary Examiner*—Andre J Allen
(74) *Attorney, Agent, or Firm*—Kenyon & Kenyon LLP

(57) ABSTRACT

A pressure sensor module having a sensor housing which includes a housing part in which electrical conductors are partially embedded, the sensor housing being provided with a first cavity, in which a sensor system is situated, and a second cavity which is sealed against the first cavity and in which is provided at least one capacitor, and the first cavity being provided with a receptacle part having a receptacle formed by a peripheral wall, the sensor system being inserted into this receptacle and covered by a protective covering filled into the receptacle. The sensor system is contacted with connecting elements provided on the receptacle part, these connecting elements being directly connected to connecting sections of the electrical conductors; and the at least one capacitor provided in the second cavity is connected to at least one of the electrical conductors via an electrically conductive material.

13 Claims, 1 Drawing Sheet

SENSOR MODULE

FIELD OF THE INVENTION

The present invention relates to a sensor module, in particular a pressure sensor module.

BACKGROUND INFORMATION

To improve electromagnetic compatibility (EMC protection) and protect against electrostatic discharges (ESD protection), EMC capacitors are used in sensor modules. Although it is possible to integrate capacitors of this type into semiconductor pressure sensors, this requires a not inconsiderable amount of extra effort in manufacturing the pressure sensor. In addition, the integrated capacitors often fail to meet the requirements of effective ESD protection. As a result, the capacitors in conventional sensor modules are installed in the sensor housing at a different location than the sensor system.

For example, a pressure sensor module having a two-chamber design is described in German Patent Application No. DE 197 31 420 A1. The housing includes a housing part having electrical conductors partially embedded therein which are contacted with a p.c. board via bonding wire connections. The sensor housing also has a first cavity, to which pressure is applied and in which a sensor system is situated, and a second cavity, which is sealed against the first cavity and in which an EMC protective circuit having protective capacitors is situated. The sensor system and EMC protective circuit are provided together on a p.c. board. The electrical connection between the protective circuit and the sensor system is established via the printed conductors on the p.c. board. In the first chamber of the sensor housing is also provided a frame-like receptacle part having a receptacle formed by a peripheral wall, the sensor system being inserted into this receptacle and covered by a protective covering filled into the receptacle, for example a silicone gel, for the purpose of protection. A disadvantage of conventional sensor modules is that the provision of the p.c. board in the two cavities requires a relatively great amount of effort for sealing the two cavities, since seals are needed above and below the p.c. board, locations where it is difficult to provide them.

SUMMARY

A sensor module according to an example embodiment of the present invention may make it possible to give the sensor module a simple and compact design, it being possible to eliminate a p.c. board as the electrical connecting means. The sensor system having the sensor element is, inserted into a receptacle part filled with a protective covering and contacted with electrical connecting elements provided on the receptacle part. The receptacle part is provided in the first cavity of the sensor housing. The connecting elements are connected directly to the connecting sections of the electrical conductors, which may be advantageously carried out by welding. The at least one EMC capacitor provided in the second cavity is connected to at least one of the electrical conductors via an electrically conductive material, in particular a conductive adhesive. A particular advantage is that the capacitors provided in the second cavity do not have to be protected by a gel covering. Interactions between the gel and the conductive adhesive are thereby avoided.

The insertion of the sensor system into a separate receptacle part which is filled, for example, with a gel advantageously avoids the need to cover the entire first cavity with the gel and prevents air inclusions in the gel from resulting in damage to the sensor system or the bonding wire connections between the sensor system and the electrical connections. Because the electrical conductors partially embedded in the housing part are routed to the second cavity, air from the second cavity would otherwise be able to travel along the electrical conductors and enter the first cavity in the event of a partial vacuum in the first housing cavity. If this air were to escape directly from under the gel, air bubbles would form in the gel which would tend to expand abruptly in the event of pressure fluctuations and cause damage to the sensor element and, in particular, to the bonding wire connections.

In the sensor module according to an example embodiment of the present invention, air which enters the first cavity along the electrical conductors is advantageously unable to escape from under the protective covering, since the protective covering, together with the bonding wires, is situated in the receptacle part. Air bubbles in the protective covering of the sensor element are thereby avoided.

The receptacle part may advantageously be inserted into a second receptacle provided on the first housing part, this second receptacle having a wall surrounding the receptacle part. A material covering the electrical connecting point of the electrical conductors and the electrical connecting elements is provided between the wall surrounding the receptacle part and the receptacle part itself, thereby protecting the connecting point against aggressive substances. Because the electrical connection between the electrical connecting elements and the electrical conductors may be established, for example by welding, and this connection is therefore very strong, damage to the electrical connecting point due to air escaping within the second receptacle is not possible. In addition, other materials preventing the penetration of air may be selected for the protective coating of the sensor system.

It may be particularly easy to manufacture the first housing part as an injection-molded part in which the electrical conductors are partially embedded as pressed screen parts.

The sensor housing may advantageously include a first housing part and at least one second housing part, a partition wall being provided on the first housing part or the second housing part, and at least the first cavity and preferably also the second cavity being formed by mounting the second housing part on the first housing part. Due to the fact that a peripheral wall of the second housing part and a partition wall provided on the first housing part engage with grooves provided on the first housing part and filled with sealing material, it may be particularly easy to achieve a seal between the sensor housing and the outside (up to at least one pressure connection) as well as between the first cavity and the second cavity, the seal being advantageously providable on only one plane in a single process step.

The sensor module according to an example embodiment of the present invention may be advantageously designed as either an absolute pressure sensor having one pressure connection or a relative pressure sensor having two pressure connections.

BRIEF DESCRIPTION OF THE DRAWINGS

Exemplary embodiments of the present invention are illustrated in the figures and explained in greater detail below.

DETAILED DESCRIPTION OF EXAMPLE EMBODIMENTS

Figure 1:
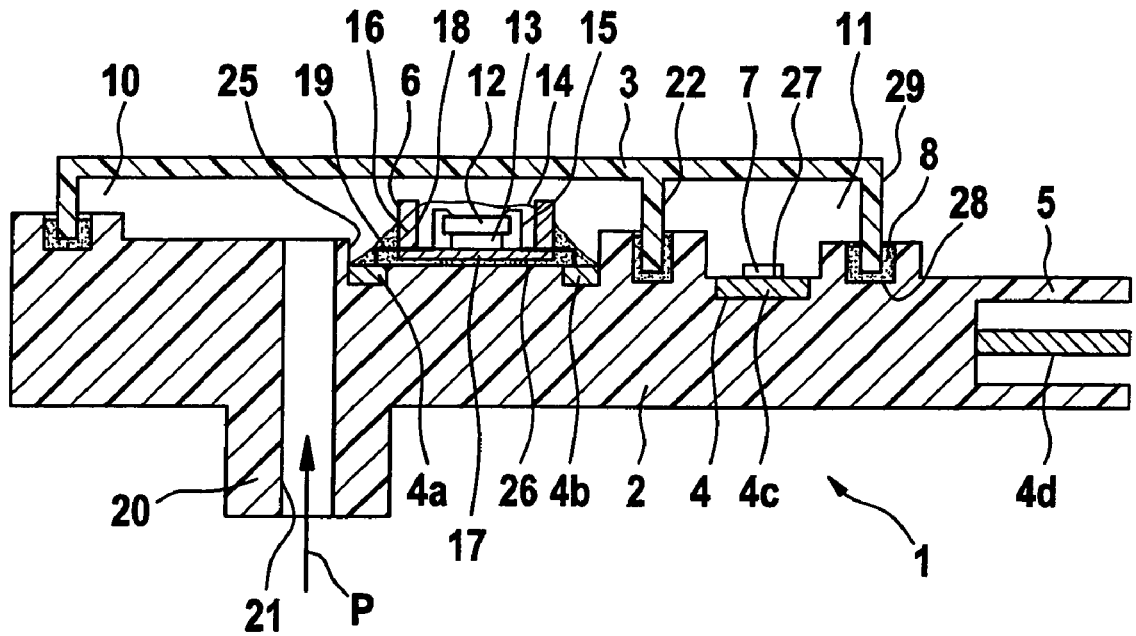
FIG. 1 shows a first exemplary embodiment of the present invention having a sensor module designed as an absolute pressure sensor.

FIG. 1 shows a first exemplary embodiment of a sensor module which is designed as a pressure sensor module for absolute pressure measurement. However, the present invention is not limited to pressure sensors and may also be used in other sensors. Pressure sensor module 1 includes a sensor housing 1 having a first housing part 2 which is manufactured as an injection-molded part into which electrical conductors 4 are partially embedded. Electrical conductors 4 may be designed, for example, as pressed screen parts, multiple electrically isolated pressed screen conductors being embedded in the plastic of housing part 1. As shown in FIG. 1, electrical conductors 4 may be routed to a plug-and-socket connection 5 provided on one side of a sensor housing 1, where connecting sections 4d of the conductor or connector pins connected thereto are formed from the plastic covering.

A second housing part 3 is also provided as a cover which is likewise manufactured, for example, as an injection-molded part made of plastic and is mounted on first housing part 1. A partition wall 22 and a peripheral wall 29 are provided on second housing part 3. When second housing part 3 is mounted on first housing part 2, peripheral wall 29 of second housing part 3 and partition wall 22 engage with grooves 28 correspondingly provided on first housing part 2, which are filled with a sealing material 8, in particular an adhesive sealing material, for example using a silicone adhesive. The two housing parts connected in this manner form a sensor housing including a first cavity 10 and a second cavity 11, the second cavity being separated from first cavity 10 by partition wall 22 and sealed against the latter so that different atmospheres and pressures may exist in the two cavities. It is also possible to design second housing part 2 in two parts having a first cover part for first cavity 10 and a second cover part for second cavity 11. First housing part 2 also includes a pressure connection 20 having a pressure channel 21 which opens into first cavity 10 so that a pressure P present at pressure connection 20 also prevails in cavity 10.

As further illustrated in FIG. 1, electrical conductors 4 have connecting sections 4a, 4b and 4c which are not embedded in the plastic of housing part 2, but instead are formed from the covering on the inside of first housing part 2 facing first cavity 10 or second cavity 11 of the sensor housing. At least one capacitor 7 provided in second housing cavity 11 is contacted with a connecting section 4c of an electrical conductor 4, preferably by a conductive adhesive provided between connecting section 4c and capacitor 7. Capacitor 7 is a protective capacitor for improving the electromagnetic compatibility (EMC protection) of the sensor module and for protecting against electrostatic discharges. It is therefore positioned between connection sections 4d of plug-and-socket connection 5 and connecting sections 4a, 4b, which are provided for contacting the sensor system.

Figure 2:
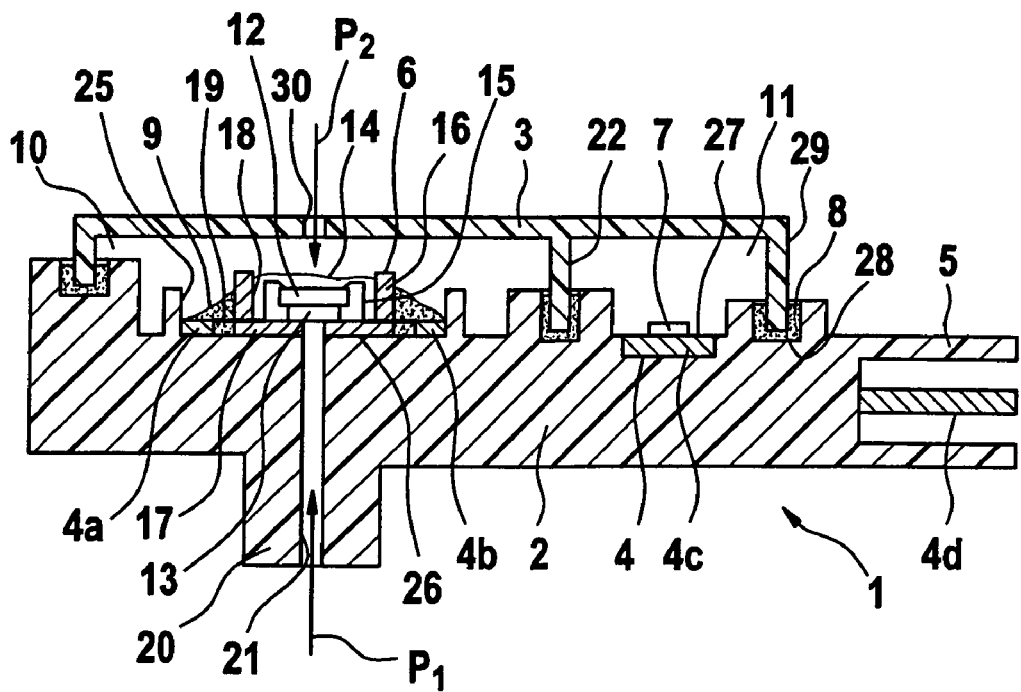
FIG. 2 shows a second exemplary embodiment of the present invention having a sensor module designed as a relative pressure sensor.

Sensor system 12, 13 includes a sensor element 12, for example a semiconductor pressure sensor having a silicon chip, on the upper side of which pressure-sensitive elements are situated, and a base 13. The sensor system is inserted into a box-shaped receptacle part 6 (premold), which has a receptacle 18 formed by a bottom 17 and a peripheral wall 16. Receptacle part 6 may be made, for example, of plastic. Receptacle part 6 also has connecting elements 19 which are routed from receptacle 18 through peripheral wall 16 to first cavity 10, where they are connected, for example by welding, to connecting sections 4a, 4b (FIG. 2 shows as an example two connecting sections 4a and 4b) of electrical conductors 4 provided on the inside of first housing part 2. Of course, it is also possible to produce the electrical connection between electrical connecting elements 19 and connecting sections 4a, 4b, by soldering or pressure contacting or through other suitable means. The ends of connecting elements 19 not connected to conductors 4 are connected to sensor element 12 inside receptacle 18, for example using bonding wire connections. To protect the sensor element, receptacle 18 of receptacle part 6 is filled with a protective covering 14, for example a gel. When pressure is applied to cavity 10, the pressure is transmitted to sensor element 12 via the elastic gel.

As further illustrated in FIG. 1, the inside of first housing part 2, which faces first cavity 10, has a second receptacle 26, which is formed by an indentation on the inside of first housing part 2, and also has a peripheral wall 25 limiting second receptacle 26. Receptacle part 6 is positioned inside receptacle 26 limited by peripheral wall 25. A material 9 covering the electrical connecting point of electrical conductors 4 and electrical connecting elements 19, for example an adhesive, in particular a silicone adhesive, is provided between wall 25 and receptacle part 6. The adhesive is advantageously applicable together with the filling of grooves 28 on first housing part 2.

FIG. 2 shows an exemplary embodiment of a sensor module designed for reference pressure measurement. The same objects are identified by the same reference numerals as in FIG. 1. In contrast to the embodiment illustrated in FIG. 1, receptacle part 6 in this case is situated over pressure channel 21 and is provided with a recess in bottom 17 for applying a pressure P1. Base 13 also has a recess so that a first pressure P1, which is not present in first cavity 10 because pressure channel 21 is sealed against first cavity 10 in this location, is applicable to the diaphragm of sensor element 12 from below. Second housing part 3 has a second pressure connection 30 through which a pressure P2 is applicable as a reference pressure to first cavity 10 and to the upper side of the diaphragm of sensor element 12 via flexible covering 14 made of gel.

As is apparent from the two exemplary embodiments, sensor element 12 and the bonding wire connection to connecting elements 19 are especially well protected against damage, since, while air is able to pass along electrical conductors 4 injection-molded in plastic from second cavity 11 to first cavity 10, it escapes from under the covering material therein and therefore is unable to damage the bonding wire connection, since the bonding wire connection is provided inside receptacle part 6 to protect it against air penetration.

What is claimed is:

1. A sensor module, comprising:
   at least one capacitor; and
   a sensor housing having a housing part in which electrical conductors are partially embedded, the sensor housing being provided with a first cavity in which the sensor system is situated, and a second cavity which is sealed against the first cavity and in which the at least one capacitor is provided, the first cavity being provided with a receptacle part having a receptacle formed by a peripheral wall, the sensor system being inserted into the receptacle and covered by a protective covering filled into the receptacle;
   wherein the sensor system is contacted using electrical connecting elements provided on the receptacle part, the connecting elements being directly connected to connecting sections of the electrical conductors, and the at least one capacitor provided in the second cavity is connected to at least one of the electrical conductors via an electrically conductive material.

2. The sensor module as recited in claim 1, wherein the sensor module is a pressure sensor module.

3. The sensor module as recited in claim 1, wherein the receptacle part is inserted into a second receptacle provided on the housing part, the second receptacle having a wall surrounding the receptacle part, and wherein an adhesive, covering the electrical connecting point of the electrical conductors and the electrical connecting elements, is situated between the wall surrounding the receptacle part and the receptacle part.

4. The sensor module as recited in claim 1, wherein the sensor housing has a first housing part which is an injection-molded part, the electrical conductors are partially embedded as pressed screen parts in the first housing part, and the pressed screen parts are connected to a plug-and-socket connection of the sensor module on one side of the sensor housing.

5. The sensor module as recited in claim 1, wherein the sensor housing has a first housing part and at least one second housing part, a partition wall being provided on one of the first housing part or the second housing part, and at least the first cavity being formed by mounting the second housing part onto the first housing part.

6. The sensor module as recited in claim 5, wherein the second cavity is formed by mounting the second housing part into the first housing part.

7. The sensor module as recited in claim 5, wherein the one peripheral wall of the second housing part and a partition wall provided on the second housing part engage with grooves provided on the first housing part and filled with sealing material.

8. The sensor module as recited in claim 5, wherein a peripheral wall of the first housing part and a partition wall provided on the first housing part engage with grooves provided on the second housing part and filled with sealing material.

9. The sensor module as recited in claim 1, wherein the sensor module is one of: i) an absolute pressure sensor module having only one pressure connection, or ii) a relative pressure sensor module having two pressure connections.

10. The sensor module as recited in claim 1, wherein the electrical connecting elements of the receptacle part are welded to the electrical conductors of the housing part.

11. The sensor module as recited in claim 1, wherein the electrically conductive material is a conductive adhesive.

12. The sensor module as recited in claim 1, wherein the sensor system includes a silicon pressure sensor chip which is mounted on a base and is contacted with the electrical connecting elements of the receptacle part by bonding wires.

13. The sensor module as recited in claim 1, wherein the at least one capacitor is a protective EMC capacitor.

* * * * *